US009099734B2

(12) United States Patent
Yokoyama et al.

(10) Patent No.: US 9,099,734 B2
(45) Date of Patent: Aug. 4, 2015

(54) PRISMATIC SECONDARY BATTERY

(71) Applicant: Sanyo Electric Co., Ltd., Moriguchi, Osaka (JP)

(72) Inventors: Yoshinori Yokoyama, Moriguchi (JP);
Yasuhiro Yamauchi, Moriguchi (JP);
Toshiyuki Nohma, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 197 days.

(21) Appl. No.: 13/749,826

(22) Filed: Jan. 25, 2013

(65) Prior Publication Data

US 2013/0196185 A1 Aug. 1, 2013

(30) Foreign Application Priority Data

Jan. 27, 2012 (JP) ................. 2012-014752

(51) Int. Cl.
| H01M 2/12 | (2006.01) |
| H01M 2/34 | (2006.01) |
| H01M 2/22 | (2006.01) |
| H01M 2/26 | (2006.01) |
| H01M 2/02 | (2006.01) |
| H01M 2/06 | (2006.01) |
| H01M 10/04 | (2006.01) |

(52) U.S. Cl.
CPC ............... *H01M 2/345* (2013.01); *H01M 2/12* (2013.01); *H01M 2/22* (2013.01); *H01M 2/263* (2013.01); *H01M 2/0217* (2013.01); *H01M 2/06* (2013.01); *H01M 10/0431* (2013.01)

(58) Field of Classification Search
CPC ............... H01M 2/04–2/0404; H01M 2/0456; H01M 2/0473; H01M 10/0431; H01M 10/12; H01M 10/125–10/12652
See application file for complete search history.

(56) References Cited

U.S. PATENT DOCUMENTS

| 5,705,290 | A | 1/1998 | Azema |
| 5,766,790 | A | 6/1998 | Kameishi et al. |
| 5,879,832 | A * | 3/1999 | Vu et al. ................. 429/62 |
| 5,985,478 | A | 11/1999 | Kim |
| 6,228,523 | B1 | 5/2001 | Azema |
| 6,248,470 | B1 | 6/2001 | Azema et al. |
| 6,274,264 | B1 * | 8/2001 | Azema .................... 429/53 |

(Continued)

FOREIGN PATENT DOCUMENTS

| JP | 08-171898 A | 7/1996 |
| JP | 08-293301 A | 11/1996 |
| JP | 09-055197 A | 2/1997 |
| JP | 11-120979 A | 4/1999 |

(Continued)

*Primary Examiner* — Jonathan Crepeau
*Assistant Examiner* — Jacob Buchanan
(74) *Attorney, Agent, or Firm* — Westerman, Hattori, Daniels & Adrian, LLP

(57) ABSTRACT

Disclosed is a highly reliable prismatic secondary battery with a current interruption mechanism that is unlikely to be damaged even if the battery is subjected to shock due to vibration, falling, etc. A second insulating member that has a through-hole is disposed between an inversion plate and the first region of a positive electrode collector, and through the through-hole the first region of the positive electrode collector is electrically connected to the inversion plate. First to third projections to formed around the through-hole formed in the second insulating member fit respectively into first to third openings formed in the first region of the positive electrode collector, and the diameters of their apexes are widened, thus forming first to third fixing portions. Thereby, the second insulating member is robustly joined to the first region of the positive electrode collector.

18 Claims, 9 Drawing Sheets

(56) References Cited

U.S. PATENT DOCUMENTS

| | | |
|---|---|---|
| 2008/0038627 A1 | 2/2008 | Yamauchi et al. |
| 2008/0038628 A1 | 2/2008 | Yamauchi et al. |
| 2010/0233529 A1 | 9/2010 | Nansaka et al. |
| 2010/0247989 A1* | 9/2010 | Kim .............................. 429/94 |
| 2010/0323234 A1* | 12/2010 | Kim et al. ..................... 429/158 |
| 2011/0300419 A1* | 12/2011 | Byun ............................. 429/61 |

FOREIGN PATENT DOCUMENTS

| | | |
|---|---|---|
| JP | 11-154504 A | 6/1999 |
| JP | 11-307080 A | 11/1999 |
| JP | 11-329405 A | 11/1999 |
| JP | 2008-66254 A | 3/2008 |
| JP | 2008-66255 A | 3/2008 |
| JP | 2010-212034 A | 9/2010 |

* cited by examiner

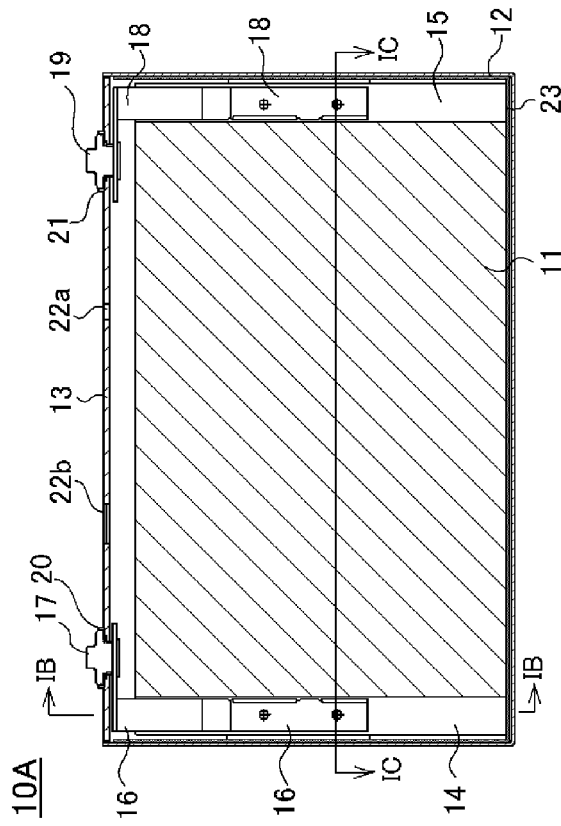
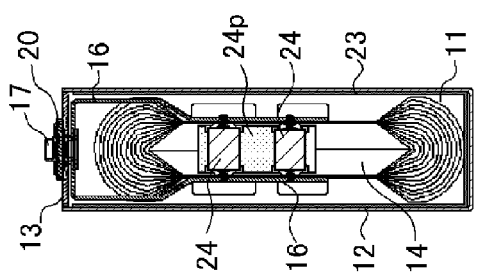
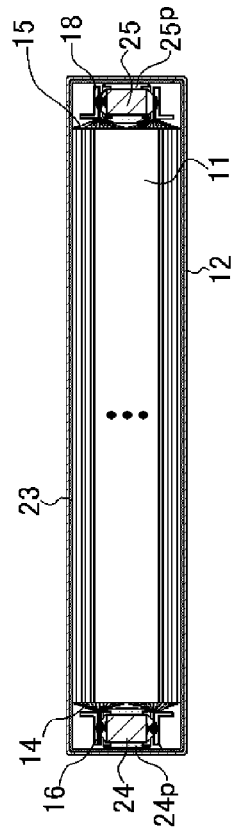
FIG. 1A
FIG. 1B
FIG. 1C

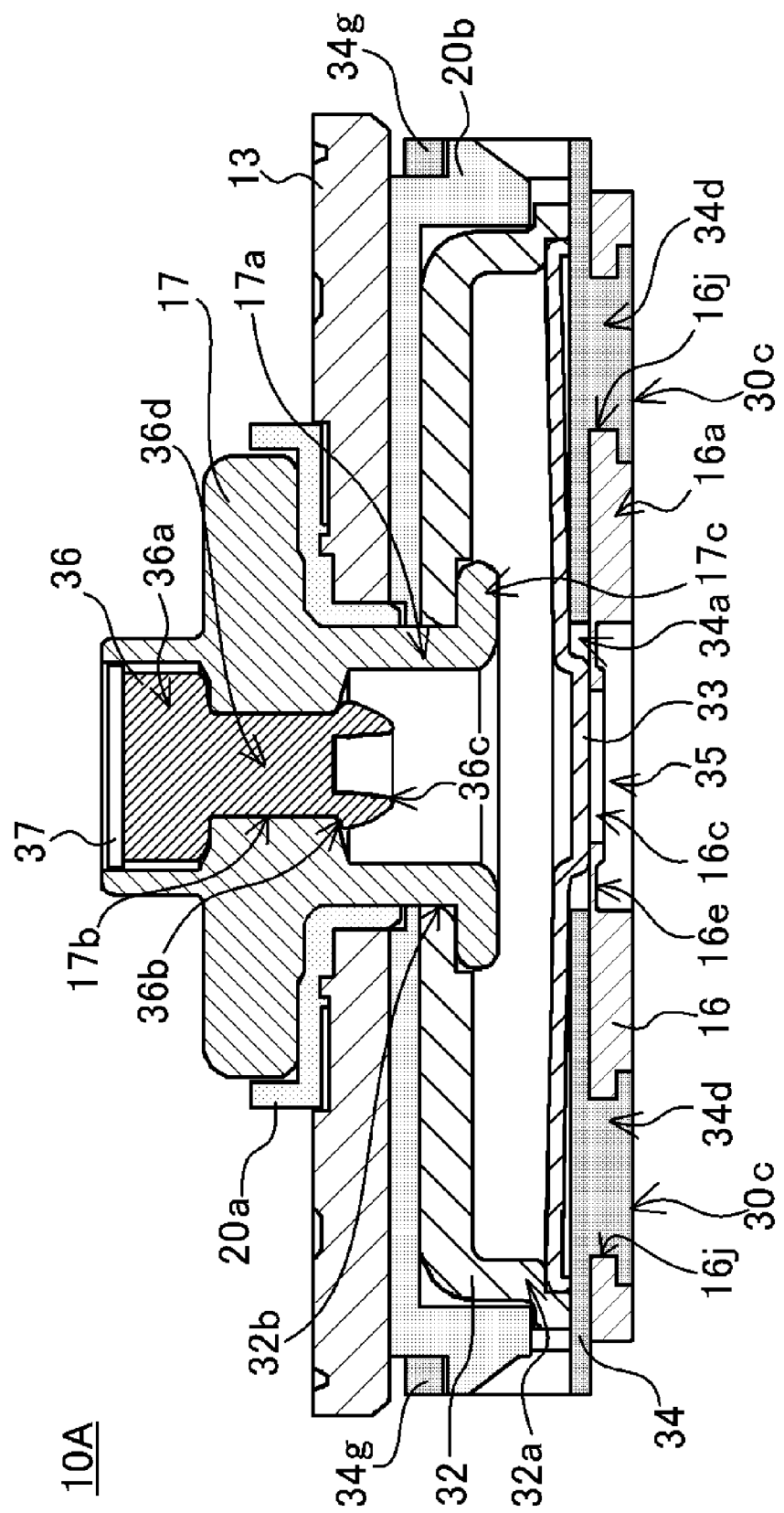

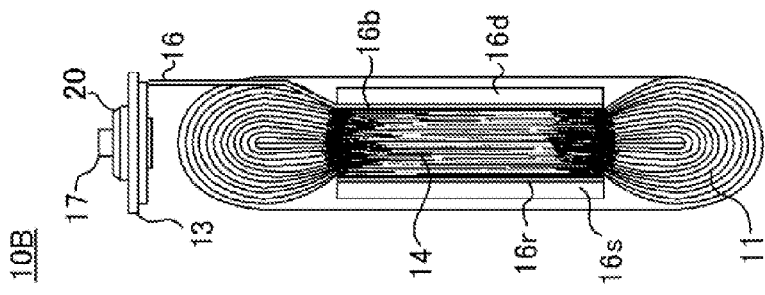
FIG. 6C
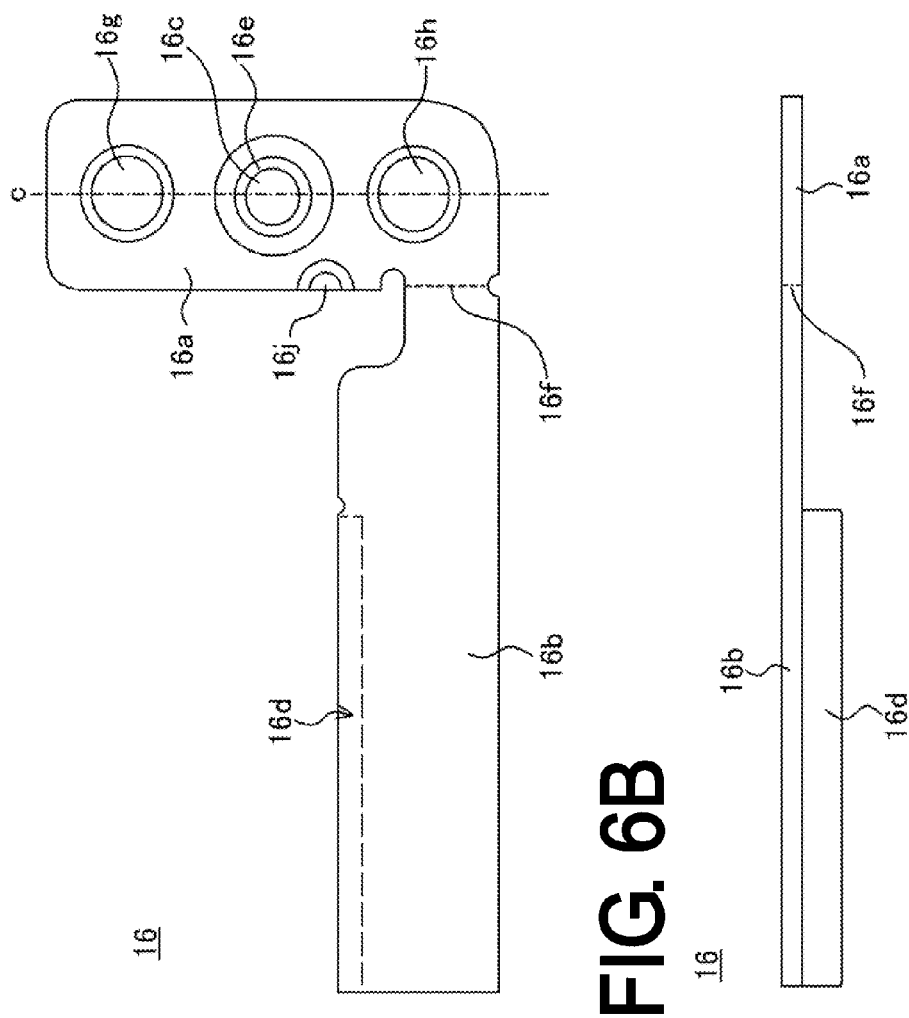
FIG. 6A
FIG. 6B

PRISMATIC SECONDARY BATTERY

TECHNICAL FIELD

The present invention relates to a prismatic secondary battery, such as a nonaqueous electrolyte secondary battery or nickel-hydrogen secondary battery, that internally includes a current interruption mechanism.

BACKGROUND ART

As the drive power sources for portable electronic equipment such as mobile telephones (including smartphones), portable computers, PDAs, and portable music players, much use is made of alkaline secondary batteries and nonaqueous electrolyte secondary batteries, typified by nickel-hydrogen batteries and lithium ion batteries, respectively. Furthermore, alkaline secondary batteries and nonaqueous electrolyte secondary batteries are also much used as drive power sources for electric vehicles (EVs) and hybrid electric vehicles (HEVs, PHEVs), and in stationary storage battery systems in applications for curbing output variation of photovoltaic power generation and wind power generation, etc., in grid power peak load shifting applications for storing power at night and using it in the daytime, and in other applications. Particularly in EV, HEV and PHEV applications or stationary storage battery systems, high capacity and high output characteristics are required. Individual batteries accordingly get larger and are used connected in series or in parallel. Prismatic secondary batteries are widely used in such cases, because of their space efficiency.

Materials extremely rich in reactivity are used for the batteries in such applications, and particularly for nonaqueous electrolyte secondary batteries. Consequently, such batteries are required to have much higher safety than the secondary batteries used for small-sized portable equipment. Therefore, prismatic secondary batteries that are used for applications of the foregoing kinds are provided not only with a gas escape valve for releasing the battery outer casing internal pressure when it increases, but also with a current interruption mechanism for breaking the electrical connection between the external terminals and the electrode assembly inside the outer casing—as set forth, for example, in JP-A-2008-66254, JP-A-2008-66255 and JP-A-2010-212034.

For example, JP-A-2008-66254 discloses the invention of a prismatic secondary battery 50 that, as shown in FIG. 8A, includes an external terminal 53 having a through-hole 52 putting a current interruption mechanism 51 in communication with the space exterior to the prismatic secondary battery 50, and is so configured that the current interruption mechanism 51 is reliably actuated when the pressure inside the outer casing 54 increases. Furthermore, JP-A-2008-66255 discloses the invention of a prismatic secondary battery 60 that, as shown in FIG. 8B, includes an external terminal 63 having a through-hole 62 putting a current interruption mechanism 61 in communication with the space exterior to the prismatic secondary battery 60, and is so configured that the current interruption mechanism 61 is actuated when the pressure inside the outer casing 64 increases, and configured that the through-hole 62 is sealed by a membrane plug 65 of resin, in order to prevent moisture or oxygen from entering the current interruption mechanism 61 through the through-hole 62 and causing deterioration of the current interruption mechanism 61.

In the prismatic secondary batteries disclosed in JP-A-2008-66254 and JP-A-2008-66255, the through-hole is provided so that the battery exterior is in communication with the space in the current interruption mechanism that corresponds to the outside of the battery, and hence that the current interruption mechanism will be readily actuated when the pressure inside the outer casing increases. However, even if the pressure inside the outer casing increases due to some cause, the pressure of the gas that is produced in the battery interior will be extremely high during the abnormality, and there will be no simultaneous similar increase in the pressure inside the sealed space in the current interruption mechanism that corresponds to the outside of the battery. This means that there will be no substantial difference in the actuation of the current interruption mechanism, whether the space in the current interruption mechanism that corresponds to the outside of the battery is sealed or open.

JP-A-2010-212034 therefore discloses a prismatic secondary battery 70 that, as shown in FIG. 9, has a sealing body 71 that seals the mouth of the outer casing (omitted from the drawing), and a connection terminal 72 that is installed to the sealing body 71, with the object of rendering it difficult for electrolyte or cleaning fluid to enter the inside of the current interruption mechanism during manufacture. In this prismatic secondary battery 70, a current interruption mechanism 74 that interrupts the current in response to an increase in the pressure inside the outer casing is provided between the connection terminal 72 and a collector 73 that electrically connects the connection terminal 72 to the electrode assembly (omitted from the drawing); the connection terminal 72 has a through-hole 75 formed in its interior, the through-hole 75 which communicates with the space in the current interruption mechanism 74 that corresponds to the outside of the battery; and the through-hole 75 is sealed by a terminal plug 76 formed of an elastic member, so that a sealed space is formed between the through-hole 75 and the current interruption mechanism 74.

This current interruption mechanism 74 includes an inversion plate 77 that performs the function of a valve body, and the thin portion 73a of the collector 73. An annular groove 73b is formed in the thin portion 73a of the collector 73, and the inversion plate 77 is welded to the central part of the thin portion 73a. Moreover, the edge portion 77a around the periphery of the inversion plate 77 is welded to the inner circumferences of a flange portion 78a formed at the bottom end of the tubular portion of a tab member 78. The connection terminal 72 is electrically insulated from the sealing body 71 with an upper first insulating member 79 and a lower first insulating member 80 interposed therebetween, and is electrically connected to the top end of the tubular portion of the tab member 78. A second insulating member 81 of resin is disposed between the collector 73 and the inversion plate 77 at the periphery of the current interruption mechanism 74, and this second insulating member 81 is fixed to and integrated with the lower first insulating member 80 by latching-fixing portions 81a. As a result, when the pressure inside the outer casing increases, the inversion plate 77 is deformed toward the sealing body 71, and then the thin portion 73a of the collector 73 is cut through at the groove 73b. The electrical connection between the collector 73 and the inversion plate 77 is thus broken. This has the effect of stopping any further charging or discharging of the battery.

The prismatic secondary battery disclosed in JP-A-2010-212034 has high safety because it includes a current interruption mechanism. Moreover, during manufacture, the nonaqueous electrolyte or cleaning fluid, etc., will be unlikely to enter the current interruption mechanism. Thus, this invention offers the excellent advantages of a prismatic nonaqueous electrolyte secondary battery that includes high-reliability connection terminals.

However, the electrode assembly may shift in the event that the battery is subjected to shock due to vibration, falling, etc. With the prismatic secondary battery 70 disclosed in JP-A-2010-212034, the collector 73 will be pulled if the electrode assembly shifts, and fractures, cracks or the like could develop in the connecting portion between the collector 73 and the inversion plate 77. There is also a possibility that fractures, cracks or the like could develop in the welds between the inversion plate 77 and the flange portion 78a formed at the bottom end of the tubular portion of the tab member 78. If the various parts included in the current interruption mechanism 74 become damaged in this manner, the conductive pathway between the collector 73 and the connection terminal 72 could be broken or the current interruption mechanism 74 could cease to operate normally. For example, if fractures, cracks or the like are present in the welds between the inversion plate 77 and the flange portion 78a, the gas that is produced in the vicinity of the electrode assembly could enter the space inside the tubular portion of the tab member 78 through the fractures or cracks. The inversion plate 77 could fail to be deformed toward the sealing body 71 even if the pressure inside the outer casing increases, and the current interruption mechanism 74 could cease to operate normally.

The present inventors arrived at the present invention upon discovering, as a result of many and various experiments to determine a structure that would prevent such damage of the current interruption mechanism 74 in such a prismatic secondary battery, that a solution can be obtained by integratedly joining the collector 73 to the second insulating member 81 that is disposed between the flange portion 77a of the inversion plate 77 and the collector 73.

SUMMARY

An advantage of some aspects of the invention is to provide a prismatic secondary battery that is highly reliable and includes a current interruption mechanism between a collector and an external terminal, the current interruption mechanism which is unlikely to be damaged even if the battery is subjected to shock due to vibration, falling, etc.

According to an aspect of the invention, a prismatic secondary battery includes:

a bottomed, hollow, prismatic outer casing that has a mouth;

an electrode assembly that is housed inside the prismatic outer casing and has positive electrode plate and negative electrode plate;

a positive electrode collector that is electrically connected to the positive electrode plate;

a negative electrode collector that is electrically connected to the negative electrode plate;

a sealing body that seals the mouth of the outer casing;

at least one external terminal that is inserted into a through-hole provided in the sealing body while being electrically insulated from the sealing body with first insulating member interposed therebetween;

a conductive member that has a tubular portion;

an inversion plate containing conductive material, that is deformed when the battery interior pressure exceeds a particular value; and a second insulating member that is interposed between the inversion plate and at least one of the positive electrode collector and the negative electrode collector, and in which a through-hole is formed.

In the prismatic secondary battery, at least one of the positive electrode collector and the negative electrode collector is connected to the inversion plate through the through-hole formed in the second insulating member.

One end of the tubular portion of the conductive member is electrically connected to the external terminal, and the other end is sealed by the inversion plate.

At least one of the positive electrode collector and the negative electrode collector has a first region that is parallel to the sealing body and a second region that extends from the first region in the direction of the electrode assembly and is connected to the positive electrode plate or negative electrode plate.

The first region has: a connecting portion with the inversion plate; a first opening and a second opening each of which has at least one portion located on the centerline passing through the center of the connecting portion in the direction of the long sides of the sealing body and which are formed at both sides of the connecting portion; and at least one third opening or cut-out that is formed at a position distant from the centerline.

The second insulating member has projections formed at positions corresponding to each of the first opening, the second opening, and the at least one third opening or cut-out, which are formed in the first region.

The first opening, the second opening, and the at least one third opening or cut-out, which are formed in the first region, each engage with the projections formed in the second insulating member to form a first fixing portion, a second fixing portion, and a third fixing portion, respectively.

In the prismatic secondary battery of the invention, a pressure-sensitive current interruption mechanism is formed, as a safety means, with the conductive member that has a cylindrical portion, the inversion plate, the second insulating member, and at least one of the positive electrode collector and the negative electrode collector. Specifically, when the pressure inside the outer casing increases, the inversion plate is deformed, and then the connecting portion between the collector and the inversion plate, or the brittle portion of the thin portion, groove portion or similar provided in the collector, fractures. Consequently, the electrical connection between the collector and the inversion plate is interrupted and current ceases to flow between the prismatic secondary battery and the external circuits. Thus, a prismatic secondary battery with superior safety is obtained.

Moreover, in the prismatic secondary battery of the invention, the projections formed in the second insulating member engage with the first opening, the second opening, and the at least one third opening or cut-out, which are formed in at least one of the positive electrode collector and the negative electrode collector. Thus, at least one of the positive electrode collector and the negative electrode collector is robustly integrated with the second insulating member. This will prevent damage to the connecting portion between at least one of the positive electrode collector and the negative electrode collector and the inversion plate, or to other parts, even if the battery is subjected to shock due to vibration, falling, etc., and the electrode assembly shifts, dragging the collector to have the second region pulled. Thus, a highly reliable prismatic secondary battery will be obtained in which the current interruption mechanism will be unlikely to be damaged even if the battery is subjected to shock due to vibration, falling, etc.

The prismatic secondary battery of the invention can be applied both to a nonaqueous electrolyte secondary battery and to a nickel-hydrogen or similar secondary battery. Furthermore, it can also be applied to an electrode assembly including positive electrode plate and negative electrode plate wound or stacked together, with separators interposed for mutual insulation, into a flattened shape. The particular advantages of this invention will be yielded whether it is applied to the positive electrode side or the negative electrode side, and applying it to both sides will also be possible.

In the prismatic secondary battery of the invention, it is preferable that the projections formed in the second insulating member have the apex with a widened-diameter portion, with a diameter larger than that of the other portions, and that the first fixing portion, the second fixing portion, and the third fixing portion be formed so that the projections formed in the second insulating member engage by means of the widened-diameter portions with the first opening, the second opening, the at least one third opening or cut-out, which are formed in the first region.

With such structure, once the second insulating member and the collector are integrated together, the two will not easily separate since the widened-diameter portions will function as retainers. Thus, a highly reliable prismatic secondary battery will be obtained in which the current interruption mechanism will be further unlikely to be damaged even if the battery is subjected to shock due to vibration, falling, etc. The widened-diameter portion at the apex of the projection can be formed simply by, for example, inserting the projection into the corresponding opening formed in the first region of the positive electrode collector or the negative electrode collector and thereafter heating or pressing the tips of the projections to widen the diameter. An engagement portion such as a pawl may be provided as the widened-diameter portion at the apex of the projection, and the engagement portion may be inserted into the opening, thereby integrating the two robustly.

Furthermore, it is advisable that an opening be employed as the at least one third opening or cutout if the short side of the prismatic battery is long, and a cutout is employed if the short side is short. In either case, the bond strength between the positive electrode collector or the negative electrode collector and the second insulating member will be increased. When a cutout is employed, its center need not necessarily be located inside the first region.

In the prismatic secondary battery of the invention, it is preferable that the connecting portion and the first and second fixing portions be disposed aligned on the centerline, and that the third fixing portion be provided in a region nearer to the boundary between the first and second regions than to the centerline, in a direction perpendicular to the centerline.

With the connecting portion and the first and second fixing portions disposed aligned, the stress acting on the connecting portion will be more effectively suppressed on both sides of the connecting portion even if the second region of the collector is pulled due to the electrode assembly shifting in the event that the battery is subjected to shock as a result of vibration, falling, etc. Moreover, the third fixing portion is provided in a region nearer to the boundary between the first and second regions than to the centerline, in a direction perpendicular to the centerline passing through the center of the connecting portion in the direction of the long side of the sealing plate. Thus, the third fixing portion will more effectively suppress the stress that will act from the collector side if the second region of the collector is pulled due to the electrode assembly shifting in the event that the battery is subjected to shock as a result of vibration, falling, etc. Thus, a highly reliable prismatic secondary battery will be obtained in which the current interruption mechanism will be further unlikely to be damaged even if the battery is subjected to shock due to vibration, falling, etc.

In the prismatic secondary battery of the invention, two second regions may be provided in mutually opposite positions relative to the centerline, and third fixing portions may be provided on both sides in a direction perpendicular to the centerline.

With two second regions in the collector connected to the positive electrode plate or negative electrode plate, the boundaries formed between the first region and the two second regions will be present on both sides of the centerline. Thus, the first region will be unlikely to be deformed even if the second regions of the collector are pulled due to the electrode assembly shifting in the event that the battery is subjected to shock as a result of vibration, falling, etc. Moreover, in the prismatic secondary battery of the invention, third fixing portions are provided on both sides in a direction perpendicular to the centerline. Thus, the first region will be unlikely to be deformed if the electrode assembly shifts in the event that the battery is subjected to shock due to vibration, falling, etc. Thus, a highly reliable prismatic secondary battery will be obtained in which the current interruption mechanism will be further unlikely to be damaged In the prismatic secondary battery of the invention, a single second region may be provided.

With a single second region in the collector connected to the positive electrode plate or negative electrode plate, the single second region will be provided in a single location distant from the centerline. Consequently, the first region will be prone to deform on the side, with respect to the centerline, where the boundary between the first and second regions is located. With such prismatic secondary battery of the invention, the first region will be prone to deform on the second region side of a line joining the centers of the first and second fixing portions, if the second region of the collector is pulled due to the electrode assembly shifting in the event that the battery is subjected to shock as a result of vibration, falling, etc. With such prismatic secondary battery of the invention, one third fixing portion is provided in a region nearer to the boundary between the first and second regions than to the centerline in a direction perpendicular to the centerline passing through the center of the connecting portion in the direction of the long side of the sealing plate. Therefore, even if the second region of the collector is pulled due to the electrode assembly shifting in the event that the battery is subjected to shock as a result of vibration, falling, etc., the third fixing portion will suppress the stresses arising among these components. Thus, a highly reliable prismatic secondary battery will be obtained in which the current interruption mechanism will be further unlikely to be damaged.

In the prismatic secondary battery of the invention, it is preferable that the connecting portion be formed on the distant side from the boundary, of a line joining the center of the third fixing portion and the center of whichever of the first and second fixing portions is nearer to the boundary.

With the connecting portion disposed on the distant side, from the boundary of a line joining the center of the third fixing portion and the center of whichever of the first and second fixing portions is nearer to the boundary, stress will be unlikely to act on the connecting portion although the portion along the line joining the center of the third fixing portion and the center of whichever of the first and second fixing portions is nearer to the boundary will be prone to deform, if the second region of the collector is pulled due to the electrode assembly shifting in the event that the battery is subjected to shock as a result of vibration or falling, etc. Thus, a highly reliable prismatic secondary battery will be obtained in which the current interruption mechanism is further unlikely to be damaged.

In the prismatic secondary battery of the invention, it is preferable that the third fixing portion be formed on the second region side of the connecting portion, in a position distant from the region joining the connecting portion and the boundary.

The density of the current that flows through the first region is highest at the region joining the connecting portion and the boundary. With such prismatic secondary battery of the invention, the third fixing portion is provided in a position distant from the region joining the connecting portion and the boundary. Thus, a prismatic secondary battery will be obtained in which the internal resistance is not high even if a third fixing portion is provided.

In the prismatic secondary battery of the invention, it is preferable that the third fixing portion be formed between the position corresponding to the first fixing portion and the position corresponding to the second fixing portion.

With such structure, the stress when the second region of the collector is pulled due to the electrode assembly shifting in the event that the battery is subjected to shock as a result of vibration, falling, etc., will be suppressed by the third fixing portion, and then be applied to the connecting portion. Thus, a highly reliable prismatic secondary battery will be obtained in which the current interruption mechanism is yet more unlikely to be damaged.

In the prismatic secondary battery of the invention, it is preferable that the third fixing portion have a diameter that is smaller than those of the first and second fixing portions.

The provision of a third fixing portion causes an increase in the internal resistance because the sectional area of the conductive pathway becomes smaller. In addition, the stress produced by the deformation of the collector when dragged by the shifting of the electrode assembly in the event that the battery is subjected to shock due to vibration, falling, etc., will be smaller on the third fixing portion than on the first or second fixing portion. Hence, by making the diameter of the third fixing portion smaller than those of the first and second fixing portions, a prismatic secondary battery will be obtained in which the current interruption mechanism is unlikely to be damaged, and moreover the internal resistance is low.

In the prismatic secondary battery of the invention, it is preferable that the first and second regions be formed by folding a piece of plate material.

With such structure, the first and second regions of the collector will be easy to form, and moreover the boundary between the first and second regions will be of high strength. Thus, a highly reliable prismatic secondary will be easily obtained.

In the prismatic secondary battery of the invention, it is preferable that the first and second regions be formed of a conductive material with rigidity.

The first and second regions of the collector are preferable to be formed of a conductive material with rigidity, since the electrode assembly will be curbed from shifting inside the outer casing in the event that the battery is subjected to shock due to vibration, falling, etc. The conductive material with rigidity will preferably be a metallic material of thickness not less than 0.3 mm, or more preferably not less than 0.5 mm.

In the prismatic secondary battery of the invention, it is preferable that a thin portion and/or a groove be formed at the periphery of the connecting portion between at least one of the positive electrode collector and the negative electrode collector and the inversion plate.

With a brittle portion such as a thin portion or a groove formed at the periphery of the connecting portion between at least one of the positive electrode collector and the negative electrode collector and the inversion plate, such a brittle portion will readily fracture when the inversion plate is deformed, which will enhance the safety. In addition, the actuation pressure for the current interruption mechanism can be set to a particular value by determining as appropriate the thickness and formation extent of such a brittle portion, thereby enhancing the reliability. It is more preferable that a thin portion be provided at the periphery of the connecting portion between at least one of the positive electrode collector and the negative electrode collector and the inversion plate, and an annular groove be provided in the thin portion so as to encircle the connecting portion.

In the prismatic secondary battery of the invention, it is preferable that in the external terminal a through-hole be formed that puts the battery exterior in communication with the space on the inside of the tubular portion of the conductive member, and that the through-hole in the external terminal be sealed by a sealing member.

The through-hole is formed in the external terminal in order to implement leak inspection of the current interruption mechanism part-way through assembly. It sometimes happens that electrolyte or cleaning fluid enters the through-hole during the pouring-in of the electrolyte or during cleaning. If electrolyte or cleaning fluid enters the through-hole, the current interruption mechanism could be corroded and consequently cease to operate normally. With the prismatic secondary battery of the invention, the through-hole is sealed by a sealing member and moreover the space between the through-hole and the current interruption mechanism is a sealed space. Therefore, no electrolyte or cleaning fluid will enter the through-hole, and so the current interruption mechanism will not cease to operate normally. Thus, a high-reliability prismatic secondary battery will be obtained. Furthermore, a sealing plug including an elastic member can be used as the sealing member. Alternatively, a metallic member may be used as the sealing member, and the through-hole may be sealed by fitting the metallic member into the through-hole and welding the fit portion by irradiation with a laser or other high-energy beam. It will also be possible to use a sealing member of resin, or a sealing member composed of an elastic member and a metallic member.

In the prismatic secondary battery of the invention, the electrode assembly may be a flattened electrode assembly that has a plurality of stacked positive electrode exposed portions at one end and a plurality of stacked negative electrode exposed portions at the other end, with the positive electrode exposed portions being disposed so as to face to one sidewall of the prismatic outer casing and the negative electrode exposed portions being disposed so as to face to the other sidewall of the prismatic outer casing, and with the positive electrode collector being connected to the positive electrode exposed portions and the negative electrode collector being connected to the negative electrode exposed portions.

When the positive electrode exposed portions are disposed at one end of the prismatic outer casing and the negative electrode exposed portions at the other end, the distance between the positive electrode collector and the negative electrode collector can be enlarged, and so the prismatic secondary battery can be rendered high-capacity. And assembly of the prismatic secondary battery will readily be facilitated. In addition, with such prismatic secondary battery of the invention, the collector will be connected to the exposed portions of the stacked substrates, and so a battery with superior output characteristics will be obtained.

BRIEF DESCRIPTION OF THE DRAWINGS

The invention will be described with reference to the accompanying drawings, wherein like numbers reference like elements.

FIG. 1A is a sectional view of a prismatic nonaqueous electrolyte secondary battery of a first embodiment, FIG. 1B is a sectional view along line IB-IB in FIG. 1A, and FIG. 1C is a sectional view along line IC-IC in FIG. 1A.

FIG. 2 is a sectional view, in the direction of the short sides of the outer casing, of a current interruption mechanism provided on the positive electrode side of the prismatic nonaqueous electrolyte secondary battery in FIGS. 1A to 1C.

FIG. 6A is an opened-out front view of the positive electrode collector of a prismatic nonaqueous electrolyte secondary battery in a second embodiment, FIG. 6B is an opened-out side view of the same, and FIG. 6C is a sectional view, which corresponds to FIG. 1B, of the prismatic nonaqueous electrolyte secondary battery of the second embodiment.

DESCRIPTION OF EXEMPLARY EMBODIMENT

Figure 3:
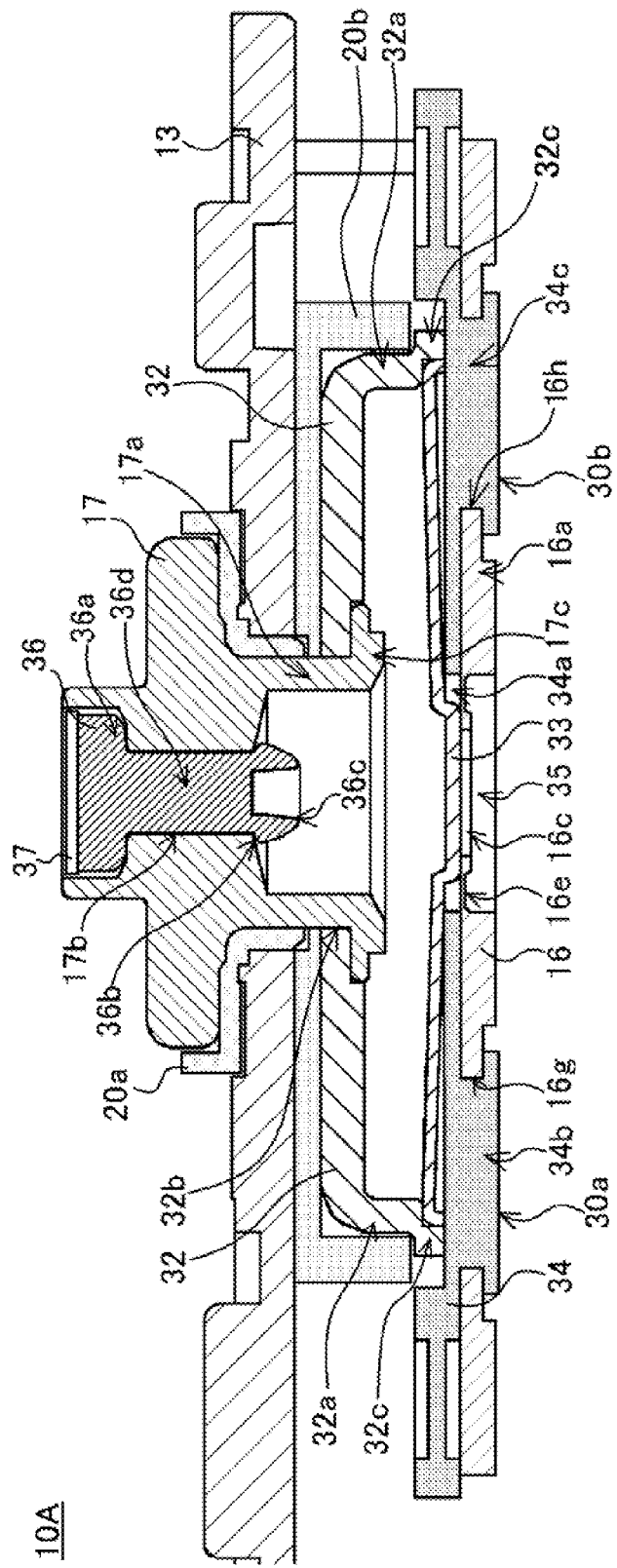
FIG. 3 is a sectional view, in the direction of the long sides of the outer casing, of the current interruption mechanism provided on the positive electrode side of the prismatic nonaqueous electrolyte secondary battery in FIGS. 1A to 1C.

Embodiments for carrying out the invention will now be described in detail with reference to the accompanying drawings. It is to be understood, however, that the following embodiments are intended as illustrative examples of a prismatic nonaqueous electrolyte secondary battery for the purpose of comprehending the technical concepts of the invention, and is not intended to limit the invention to these particular prismatic secondary battery; the invention can equally well be applied to yield many other variants without departing from the scope and spirit of the technical concepts set forth in the claims. Note that although the invention can be applied to prismatic secondary batteries that have an electrode assembly with a flattened shape produced by stacking or by winding positive electrode plate and negative electrode plate together with separators interposed, the description below is of a battery with a flattened wound electrode assembly, as a representative example.

First Embodiment

First, the prismatic nonaqueous electrolyte secondary battery of the first embodiment 1 will be described using FIGS. 1 to 5.

The prismatic nonaqueous electrolyte secondary battery 10A of the embodiment has a flattened wound electrode assembly 11 in which positive electrode plate and negative electrode plate are wound together with separators (all omitted from the drawings) interposed. To fabricate the positive electrode plate, a positive electrode active material mixture is spread over both sides of a positive electrode substrate of aluminum foil, and the resulting object is dried and rolled, then is slit at one end so that the aluminum foil is exposed in strips aligned in the lengthwise direction. To fabricate the negative electrode plate, a negative electrode active material mixture is spread over both sides of a negative electrode substrate of copper foil, and the resulting object is dried and rolled, then is slit at one end so that the copper foil is exposed in strips aligned in the lengthwise direction.

The positive electrode plate and the negative electrode plate obtained in the foregoing manner are then wound together with polyethylene microporous separators interposed therebetween in a state in which neither the aluminum foil exposed portions of the positive electrode plate nor the copper foil exposed portions of the negative electrode plate overlap with the active material layer of their opposing electrode, thereby fabricating a flattened wound electrode assembly 11 that includes, at one end of the winding axis, a plurality of positive electrode substrate exposed portions 14 that are stacked, and at the other end, a plurality of negative electrode substrate exposed portions 15 that are stacked.

The positive electrode substrate exposed portions 14 are stacked together and electrically connected to a positive electrode external terminal 17 with a positive electrode collector 16 interposed therebetween. Likewise, the negative electrode substrate exposed portions 15 are stacked together and electrically connected to a negative electrode external terminal 19 with a negative electrode collector 18 interposed therebetween. The positive electrode external terminal 17 and the negative electrode external terminal 19 are fixed to a sealing body 13, with insulating members 20 and 21, respectively, interposed therebetween. In the prismatic nonaqueous electrolyte secondary battery 10A of the embodiment, a pressure-sensitive current interruption mechanism is located between the positive electrode collector 16 and the positive electrode external terminal 17 or between the negative electrode collector 18 and the negative electrode external terminal 19. The specific structure of this current interruption mechanism will be described later.

To fabricate the prismatic nonaqueous electrolyte secondary battery 10A of the first embodiment, the flattened wound electrode assembly 11 fabricated in the foregoing manner is inserted into a prismatic outer casing 12, with a resin sheet 23 interposed around the periphery except at the sealing body 13. Subsequently, the sealing body 13 is laser-welded to the mouth portion of the outer casing 12, after which nonaqueous electrolyte is poured in through an electrolyte pour hole 22a and the electrolyte pour hole 22a is sealed. The sealing body 13 has a gas escape valve 22b that opens when gas pressure is exerted that exceeds the actuation pressure for the current interruption mechanism.

Furthermore, in the flattened wound electrode assembly 11 of the prismatic nonaqueous electrolyte secondary battery 10A of the first embodiment, the stacked positive electrode substrate exposed portions 14 of the positive electrode plate are split into two groups, between which two intermediate conductive members 24 for the positive electrode are held. Likewise, the stacked negative electrode substrate exposed portions 15 of the negative electrode plate are split into two groups, between which two intermediate conductive members 25 for the negative electrode are held. The two positive electrode intermediate conductive members 24 and the two negative electrode intermediate conductive members 25 are held by insulative intermediate members 24p and 25p, respectively, that contains resin material.

On the outermost surface of each of the two positive electrode substrate exposed portion 14 groups, which are located at the two positive electrode intermediate conductive members 24, a positive electrode collector 16 is disposed. Likewise on the outermost surface of each of the two negative electrode substrate exposed portion 15 groups, which are located at the two negative electrode intermediate conductive members 25, a negative electrode collector 18 is disposed. The positive electrode intermediate conductive members 24 contain aluminum, the same material as the positive electrode substrate. The negative electrode intermediate conductive members 25 contain copper, the same material as the negative electrode substrate. The positive electrode intermediate conductive members 24 can have a shape substantially identical to that of the negative electrode intermediate conductive members 25. The positive electrode substrate exposed portions 14 are resistance-welded both to the positive electrode collector 16 and to the positive electrode intermediate conductive members 24. Likewise, the negative electrode substrate exposed portions 15 are joined both to the negative electrode collector 18 and to the negative electrode intermediate conductive members 25 by resistance welding.

The prismatic nonaqueous electrolyte secondary battery 10A of the first embodiment illustrates an example of using two positive electrode intermediate conductive members 24 and two negative electrode intermediate conductive members 25. However, it will alternatively be possible, depending on the required output of the battery, to use one each, or three or more. With a structure that uses two or more, the positive electrode intermediate conductive members 24 and the negative electrode intermediate conductive members 25 will be held by one insulative intermediate member of resin material, and so can be positioned and disposed in a stable state between the two split-up groups of substrate exposed portions.

Next will be described the methods for resistance-welding the positive electrode intermediate conductive members 24 to the positive electrode collector 16 and to the positive electrode substrate exposed portions 14 of the flattened wound electrode assembly 11, and the methods for resistance-welding the negative electrode intermediate conductive members 25 to the negative electrode collector 18 and to the negative electrode substrate exposed portions 15. However, in the first embodiment, the shapes of the positive electrode intermediate conductive members 24 and of the negative electrode intermediate conductive members 25 are substantially identical, and moreover the resistance-welding methods for both are substantially similar. Therefore, the description below deals with the methods on the positive electrode plate side only, as being representative.

First, the positive electrode substrate exposed portions 14 of aluminum foil, of the flattened wound electrode assembly 11, are stacked. The stacked positive electrode substrate exposed portions 14 are split into two groups from the winding center portion outward to the two sides, and each group is bunched around a center that is the line along ¼ of the thickness of the wound electrode assembly 11. Subsequently, the positive electrode collector 16 is disposed on the outermost peripheries, and the positive electrode intermediate conductive members 24 are disposed on the inner peripheries, of the two bunches of positive electrode substrate exposed portions 14, in such a manner that the truncated cone-shaped protrusions of both of the positive electrode intermediate conductive members 24 contact against the positive electrode substrate exposed portions 14. Each bunch of aluminum foil has thickness of about 660 μm and 44 stacked substrates (for a total of 88). The items used for the positive electrode collector 16 are fabricated by punching and bend-processing, etc., a 0.8 mm-thick aluminum sheet.

Next, the flattened wound electrode assembly 11, in which the positive electrode collector 16 and the positive electrode intermediate conductive members 24 are disposed, is disposed between a pair of resistance welding electrodes, omitted from the drawings, that are disposed one above the other. Subsequently, the pair of resistance welding electrodes are brought into contact with the positive electrode collector 16, each of which is disposed on the outermost periphery of one of the two bunches of positive electrode substrate exposed portions 14. A suitable degree of pushing pressure is then applied between the pair of resistance welding electrodes, and resistance welding is performed under certain predetermined conditions. Since the protrusions of the positive electrode intermediate conductive members 24 thereby act as projections, the positive electrode collector 16 and two bunches of positive electrode substrate exposed portions 14, which have been disposed between the pair of resistance welding electrodes, heat up well and so large nuggets are formed. Consequently, the welds are of extremely high strength between the positive electrode collector 16 and the two bunches of positive electrode substrate exposed portions 14, the welds among the positive electrode substrate exposed portions 14, and the welds between the two bunches of positive electrode substrate exposed portions 14 and the positive electrode intermediate conductive members 24.

Moreover, during such resistance welding, the positive electrode intermediate conductive members 24 are disposed in a stably positioned state between the two bunches of positive electrode substrate exposed portions 14. This leads to the resistance welding in an accurate and stable state, the curbing of variation in the weld strength, and the realizing of low resistance of the welds. A prismatic secondary battery that is capable of high current cycling thus can be manufactured. By repeating such resistance welding as many times as the number of positive electrode intermediate conductive members 24 used, all of the resistance welding is executed—between the positive electrode collector 16 and the two bunches of positive electrode substrate exposed portions 14, among the positive electrode substrate exposed portions 14, and between the two bunches of positive electrode substrate exposed portions 14 and the positive electrode intermediate conductive members 24. This resistance welding is carried out in the same manner for the negative electrode.

Now will be described the pressure-sensitive current interruption mechanism that is interposed between the positive electrode collector 16 and the positive electrode external terminal 17 or between the negative electrode collector 18 and the negative electrode external terminal 19. This current interruption mechanism can be provided on the positive electrode side only, on the negative electrode side only, or on both the positive electrode and negative electrode sides. Below, the case where the mechanism is provided on the positive electrode side only is described, with reference to FIGS. 2 to 5.

Figure 4A:
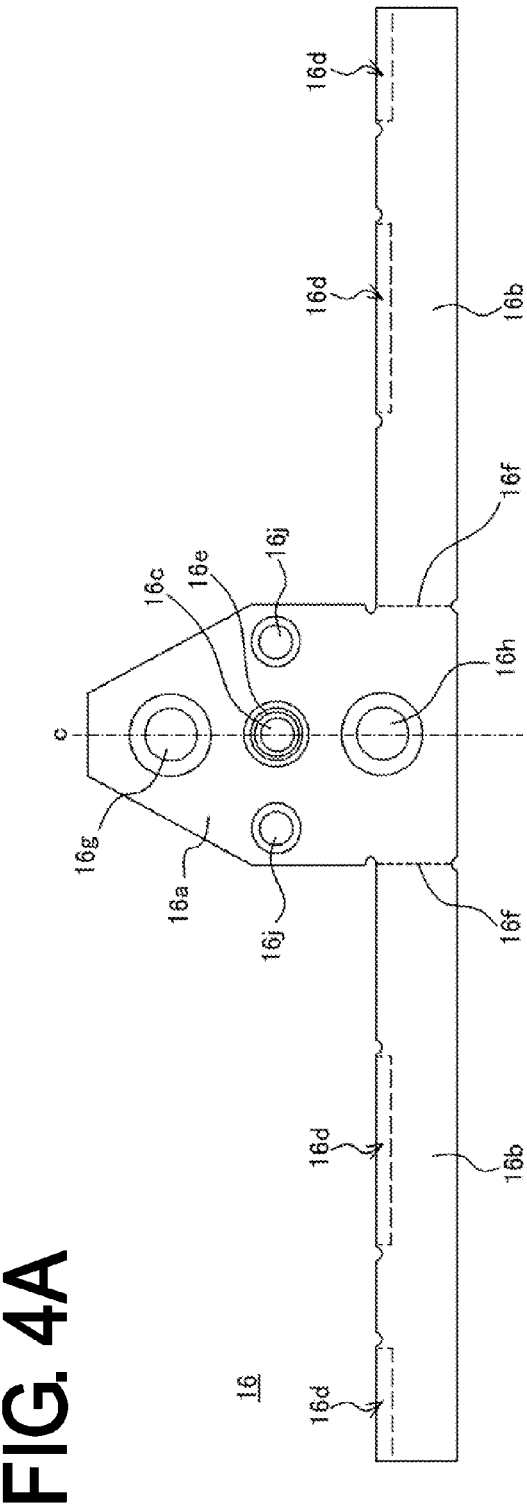
FIG. 4A is an opened-out front view of the positive electrode collector of the prismatic nonaqueous electrolyte secondary battery in FIGS. 1A to 1C.
Figure 4B:
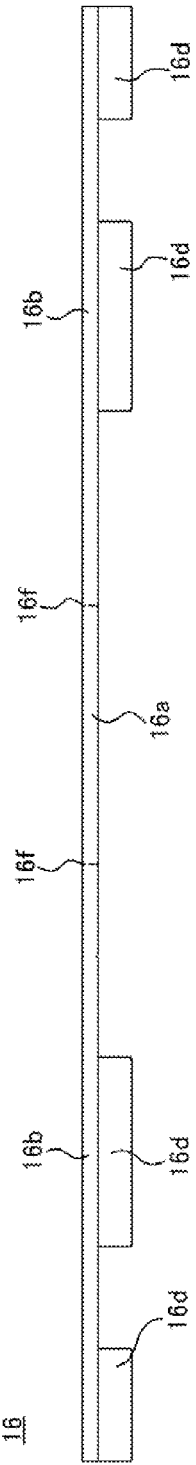
FIG. 4B is an opened-out side view of the same.

As FIGS. 1A to 1C show, the positive electrode collector 16 is connected to the positive electrode substrate exposed portions 14 disposed at one end of the wound electrode assembly 11. The positive electrode collector 16 is electrically connected to the positive electrode external terminal 17. As shown in FIGS. 4A and 4B, which are an opened-out front view and side view, respectively, positive electrode collector 16 has a first region 16a that is disposed parallel to the sealing body 13, and a pair of second regions 16b that extend outward from the first region 16a in mutually opposite directions, are folded at the dashed lines (boundaries 16f), and are connected to the positive electrode substrate exposed portions 14. The positive electrode collector 16 is fabricated by punching from aluminum sheet of thickness 0.8 mm, therefore is rigid, and cannot be folded with a small force. In FIG. 4A, notched portions are formed in both of the boundaries 16f in order to facilitate folding of the positive electrode collector 16 along the boundaries 16f.

In the central portion of the first region 16a of the positive electrode collector 16, there is formed a connection forming hole 16c. On the centerline c that passes through the center of the connection forming hole 16c in the direction of the long sides of the sealing body 13, there are formed a first opening 16g and a second opening 16h, one on each side of the connection forming hole 16c. In the direction perpendicular to the centerline c, there are formed two third openings 16j, one on each side. The diameters of the first opening 16g and second opening 16h are identical. The diameters of both two third openings 16j are identical and are determined so as to be smaller than the diameters of the first opening 16g and second opening 16h. In the second regions 16b of the positive electrode collector 16, there are formed ribs 16d on the side facing the base portion of the positive electrode substrate exposed portions 14. These ribs 16d perform the roles of positioning the positive electrode collector 16 relative to the positive electrode substrate exposed portions 14, positioning the wound electrode assembly 11 relative to the battery outer casing 12, preventing the spatter that occurs during resistance welding of the positive electrode collector 16 to the positive electrode substrate exposed portions 14 from entering the wound electrode assembly 11, and so forth. The portion around the circumference of the connection forming hole 16c in the first region 16a is an annular thin region 16e whose thickness is smaller than those of the other portions.

The positive electrode external terminal 17 has tubular portion 17a, and a through-hole 17b formed in its interior. The tubular portion 17a of the positive electrode external terminal 17 is inserted into holes formed in an upper first insulating member 20a such as a gasket, in the sealing body 13, in a lower first insulating member 20b and in conductive member 32 having a tubular portion 32a, and the tip portions 17c are swaged and fixed so as to be mutually integrated. The conductive member 32 has a tubular portion 32a formed at its battery interior end, while at its battery exterior end—that is, sealing body 13 end, where the diameter narrows—there is formed opening 32b into which the tubular portion 17a of the positive electrode external terminal 17 is inserted. The tip portion 17c of the tubular portion 17a of the positive electrode external terminal 17 is swaged near the opening 32b in the conductive member 32, and is laser-welded to the connection portion of the conductive member 32. Thereby, the positive electrode external terminal 17 is electrically connected to the conductive member 32 in such a state as to be electrically insulated from the sealing body 13 by the upper first insulating member 20a and the lower first insulating member 20b. Both the upper first insulating member 20a and the lower first insulating member 20b correspond to the first insulating member of the invention.

The periphery of an inversion plate 33 is hermetically welded to and is sealed up the battery interior-end tip of the tubular portion 32a of the conductive member 32. The inversion plate 33 is shaped so as to protrude slightly, from the periphery towards the center, in the direction of the battery interior—that is, shaped so as to be in a slanted positional relationship with the sealing body 13. The inversion plate 33 contains a conductive material and has the function of a valve that is deformed toward the exterior of the battery when the pressure inside the outer casing 12 increases. The first region 16a of the positive electrode collector 16 contacts against the center portion of the inversion plate 33. The inner wall portion of the connection forming hole 16c in the thin region 16e formed in the first region 16a is laser-welded at a plurality of locations to the surface of the inversion plate 33. Although omitted from the drawings, these locations where the inner wall portion of the connection forming hole 16c in the thin region 16e is laser-welded to the surface of the inversion plate 33 correspond to the connections of the invention.

Furthermore, between the first region 16a of positive electrode collector 16 and the inversion plate 33, there is formed a second insulating member 34 that contains resin material and has a through-hole 34a. The first region 16a of positive electrode collector 16 is electrically connected to the inversion plate 33 through the through-hole 34a. Around this through-hole 34a in the second insulating member 34, there are formed a first projection 34b in the position corresponding to the first opening 16g in the first region 16a of the positive electrode collector 16, a second projection 34c in the position corresponding to the second opening 16h, and a third projection 34d in the position corresponding to the third openings 16j.

The first to third projections 34b to 34d of the second insulating member 34 are inserted into the first to third openings 16g to 16j, respectively, formed in the first region 16a of positive electrode collector 16, and by heating the tips of the first to third projections 34b to 34d to widen their diameters, the second insulating member 34 and the first region 16a of positive electrode collector 16 are fixed to each other. As a result, the first to third projections 34b to 34d of the second insulating member 34 are, thanks to the widened-diameter portions formed in each of them, prevented from falling out from the first to third openings 16g to 16j formed in the first region 16a of positive electrode collector 16, and the second insulating member 34 are robustly joined to the first region 16a of positive electrode collector 16. The fixing portions formed from these first to third openings 16g to 16j formed in the first region 16a of positive electrode collector 16 and from the first to third projections 34b to 34d of the second insulating member 34 each corresponds to the first to third fixing portions 30a to 30c of the present invention. The second insulating member 34 and the lower first insulating member 20b, which constitute the first insulating member, will preferably be fixed together by engaging to each other. There is no particular restriction on such fixing method, but in this embodiment, the second insulating member 34 and the lower first insulating member 20b constituting the first insulating member are fixed together by means of latch portions 34g.

Thus, the positive electrode substrate exposed portions 14 are electrically connected to the positive electrode external terminal 17 via the first and second regions 16a and 16b, thin region 16e of positive electrode collector 16, and via the inversion plate 33 and the conductive member 32. The current interruption mechanism of the first embodiment is formed with the tubular portion 32a of the conductive member 32, the inversion plate 33, the second insulative member 34, and the thin region 16e that is formed in the first region 16a of positive electrode collector 16.

Specifically, the inversion plate 33 is so configured so as to swell toward the through-hole 17b in the positive electrode external terminal 17 when the pressure inside the battery outer casing 12 increases. Since the thin region 16e in the first region 16a of positive electrode collector 16 is welded to the central portion of the inversion plate 33, the first region 16a of positive electrode collector 16 fractures at the thin region 16e portion when the pressure inside the outer casing 12 exceeds a particular level. Consequently, the electrical connection between the inversion plate 33 and the first region 16a of positive electrode collector 16 is interrupted.

Thus, with the thin region 16e, first region 16a will be prone to fracture at the thin region 16e portion when the inversion plate 33 is deformed, and will reliably fracture at the thin region 16e portion when the pressure inside the battery increases. This enhances the safety of the prismatic electrolyte nonaqueous secondary battery 10A. It is also possible, by determining the thickness and formation extent of the thin region 16e portion as appropriate, to set the pressure at which the thin region 16e portion fractures as the particular pressure level. This too will enhance the reliability.

An example has been described here in which the thin region 16e, which has a thickness smaller than the other portions, is formed ring-like in the portion around the periphery of the connection forming hole 16c in the first region 16a. However, it will be more preferable that, in the thin region 16e, a ring-like groove be provided so as to encircle the connection forming hole 16c. This groove may also be formed in an intermittent annular form. It is alternatively possible to form the thin region 16e by leaving the periphery portion around the connection forming hole 16c in the first region 16a with the same thickness as the other portions and forming in such periphery portion an annular or intermittent annular groove. The thin region 16e and groove are not essential structural elements. It will alternatively be possible, without providing the thin region 16e or groove, to adjust the strength of the connections between the inversion plate 33 and positive electrode collector 16 so that such connections will be broken if the inversion plate 33 is deformed.

The positive electrode collector 16 includes items that have rigidity and cannot be folded by a small force. Thus, when the wound electrode assembly 11 shifts toward the sealing body 13 due to vibration, falling, etc., the force that acts on the first region 16a of positive electrode collector 16 will be absorbed by the second region 16b portions and thus be rendered small. Hence, in the event that the wound electrode assembly 11 shifts toward the sealing body 13 due to vibration, falling, etc., the force exerted to the first region 16a will be small, the possibility of the thin region 16e fracturing will thus be suppressed, and the influence upon the actuation of the pressure-sensitive current interruption mechanism 35 will be small. In this way, a prismatic nonaqueous electrolyte secondary battery 10A with superior safety and reliability will be obtained.

The specific dispositional arrangement of the first to third fixing portions 30a to 30c in the prismatic nonaqueous electrolyte secondary battery 10A of Embodiment 1 will now be described using FIG. 5. When the dispositions of the first and second fixing portions 30a and 30b have been determined, the third fixing portions 30c may take any desired position, provided that the position does not overlap with the position of the first or the second fixing portion 30a or 30b. However, in FIG. 5, if the third fixing portions 30c are formed further leftward (centerward along the longitudinal direction of the sealing body 13) than a line that is perpendicular to the centerline c and passes through the center of the connection forming hole 16c, the effect of the third fixing portions 30c in suppressing the stress on the connecting portion when the second region of the collector is pulled due to the electrode assembly shifting in the event that the battery is subjected to shock as a result of vibration, falling, etc., will decline as the formation positions of the third fixing portions 30c are located more leftward. Locating the third fixing portions 30c further leftward than the position corresponding to the first fixing portion 30a will be undesirable since the stress suppressing effect of the third fixing portions 30c will be small. Hence, it is preferable that the centers of the third fixing portions 30c be located further rightward (the edge side along the longitudinal direction of the sealing body 13) than a line that is perpendicular to the centerline c and passes through the right edge (the edge side along the longitudinal direction of the sealing body 13) of the first fixing portion 30a.

If the third fixing portions 30c are formed further rightward (the edge side along the longitudinal direction of the sealing body 13) than a line that is perpendicular to the centerline c and passes through the center of the connection forming hole 16c, then the effect of the third fixing portions 30c in suppressing the stress on the connecting portion when the second region of the collector is pulled due to the electrode assembly shifting in the event that the battery is subjected to shock as a result of vibration, falling, etc., will be large as the formation positions of the third fixing portions 30c are located more rightward. However, if the formation positions of the third fixing portions 30c are further rightward (the edge side along the longitudinal direction of the sealing body 13) than the position corresponding to the second fixing portion 30b, the effect of the third fixing portions 30c in suppressing the stress on the connecting portion will decline. Hence, it will be preferable that the centers of the third fixing portions 30c be located further leftward (centerward along the longitudinal direction of the sealing body 13) than a line that is perpendicular to the centerline c and passes through the right edge (the edge side along the longitudinal direction of the sealing body 13) of the second fixing portion 30b. Furthermore, to suppress an increase in the internal resistance, it is preferable that the centers of the third fixing portions 30c be located further leftward (centerward along the longitudinal direction of the sealing body 13) than a line that is perpendicular to the centerline c and passes through the left edge (centerward along the longitudinal direction of the sealing body 13) of the second fixing portion 30b. Thus, it is preferable that the third fixing portions 30c be formed between the position corresponding to the first fixing portion 30a and the position corresponding to the second fixing portion 30b.

Figure 5:
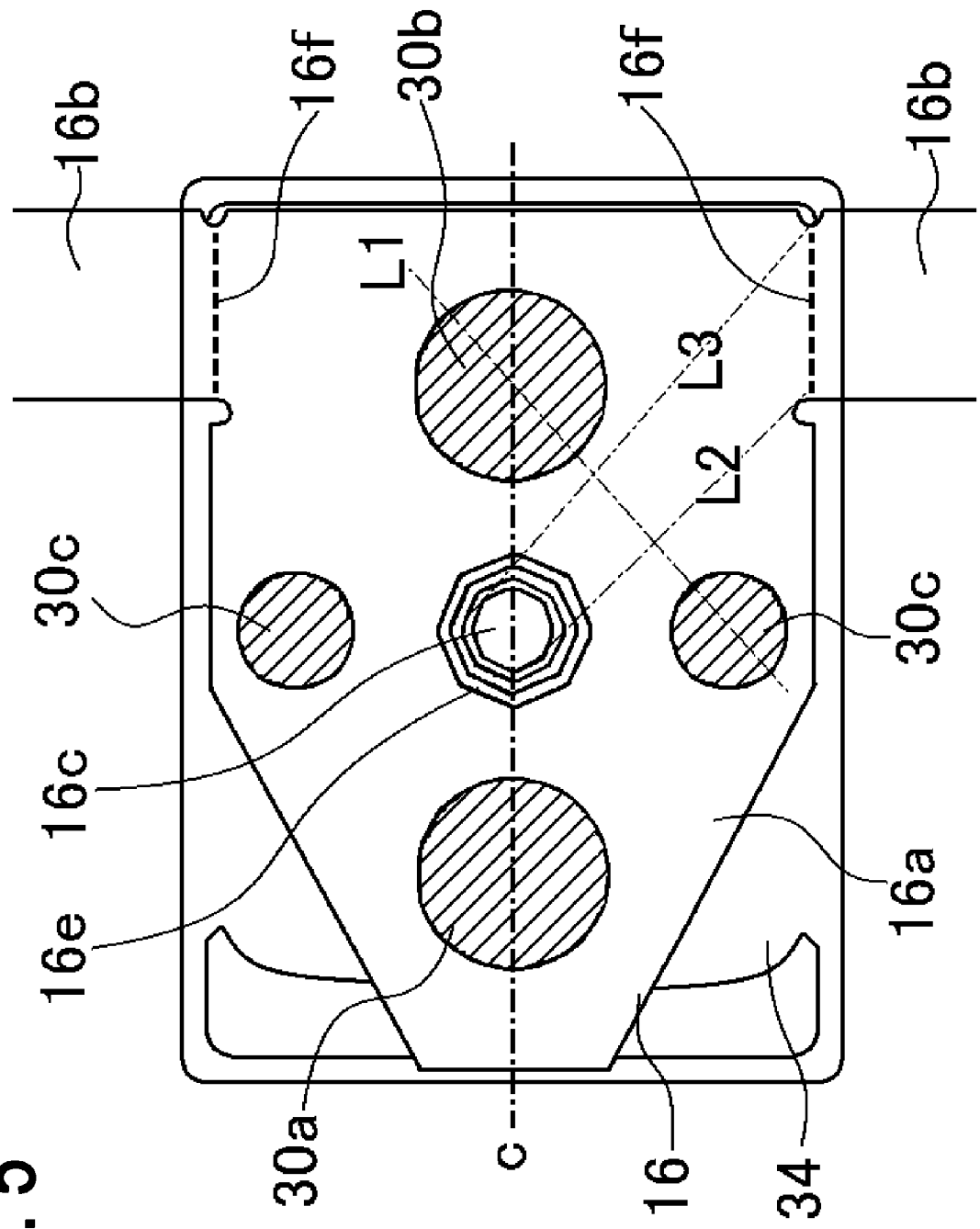
FIG. 5 is a schematic top view illustrating the state where the first region of a positive electrode collector is fixed to a second insulating member, in the prismatic nonaqueous electrolyte secondary battery shown in FIGS. 1A to 1C.

As shown in FIG. 5, the line segment joining the center of the second fixing portion 30b and the center of the third fixing portion 30c is designated "L1". In addition, the two line segments that are tangents of the connection forming hole 16c and each join to one of the two ends of the boundary 16f are designated "L2" and "L3". In the prismatic nonaqueous electrolyte secondary battery 10A of Embodiment 1, the connection forming hole 16c, which forms the connecting portion, is disposed leftward of line segment L1 in FIG. 5, that is, on the distant side, of line segment L1, from the boundary 16f between the first region 16a and the second region 16b. With such structure, stress will be unlikely to act on the connection forming hole 16c portion that forms the connecting portion although deformation will be prone to occur along the line segment L1 when the second region of the collector is pulled due to the electrode assembly shifting in the event that the battery is subjected to shock as a result of vibration, falling, etc. By contrast, if the connection forming hole 16c is located rightward relative to line segment L1, the stress when the second region of the collector is pulled due to the electrode assembly shifting in the event that the battery is subjected to shock as a result of vibration, falling, etc., will be applied directly to the connection forming hole 16c portion that forms the connecting portion. Thus, the current interruption mechanism will be liable to be damaged. Therefore, it is preferable that in the prismatic nonaqueous electrolyte secondary battery 10A of Embodiment 1, the connection forming hole 16c that forms the connecting portion be formed on the distant side, of line segment L1 joining the center of the second fixing portion 30b and the center of the third fixing portion 30c, from the boundary 16f between the first region 16a and the second region 16b.

If the third fixing portions 30c are disposed between line segments L2 and L3, the current interruption mechanism 35 will be unlikely to be damaged since the stress when the second region of the collector is pulled due to the electrode assembly shifting in the event that the battery is subjected to shock as a result of vibration, falling, etc., will be unlikely to be applied directly to the connection forming hole 16c portion that forms the connecting portion. However, the sectional area of the conductive pathway will be small since third openings 16j (see FIG. 4A) are provided in positions corresponding to the third fixing portions 30c of the first region 16a of the positive electrode collector 16, which will lead to an increase in the battery internal resistance.

It is therefore preferable that the third fixing portions 30c be formed in positions nearer the second region 16b than the connection forming hole 16c portion that forms the connecting portion, the positions which are distant from the region enclosed by line segments L2 and L3 that join the boundary 16f and the connection forming hole 16c portion that forms the connecting portion, that is, distant from the region joining the boundary 16f and the connection forming hole 16c portion that forms the connecting portion.

The through-hole 17b in the top part of the positive electrode external terminal 17 is used for testing whether the periphery of the inversion plate 33, which is a component of the current interruption mechanism 35, has been welded hermetically, and may be used in an unchanged state. However, if corrosive gas or liquid enters the through-hole 17b and the inversion plate 33 becomes corroded, a risk will arise that the current interruption mechanism 35 may not operate normally. Thus, it will be preferable to seal up the through-hole 17b of the positive electrode external terminal 17. In the prismatic nonaqueous electrolyte secondary battery 10A of the first embodiment, the through-hole 17b formed in the positive electrode external terminal 17 has a large-diameter portion formed toward the exterior of the outer casing 12 and a small-diameter portion formed toward the interior of the outer casing 12. Taking advantage of this configuration, the through-hole 17b of the positive electrode external terminal 17 is robustly sealed by, for example, a rubber terminal plug 36 in its interior. The terminal plug 36 corresponds to the sealing member of the present invention.

This terminal plug 36 has: at the upper end, a head portion 36a whose diameter is larger than the small-diameter portion of the through-hole 17b of the positive electrode external terminal 17 and smaller than the large-diameter portion of the through-hole 17b of the positive electrode external terminal 17; at the lower end, a projecting portion 36b whose diameter is smaller than the head portion 36a and larger than the small-diameter portion of the through-hole 17b; latching portions 36c formed in a shape that tapers off from the projecting portion 36b; and in an intermediate position, a connecting portion 36d that has a diameter roughly the same as the small-diameter portion of the through-hole 17b of the positive electrode external terminal 17 and a length substantially the same as such small-diameter portion.

The terminal plug 36 is installed into the through-hole 17b of the positive electrode external terminal 17 in such a manner that the head portion 36a is located at the large-diameter portion of the through-hole 17b, and the latching portions 36c protrude beyond the end of the small-diameter portion of the through-hole 17b. Furthermore, on the surface of the head portion 36a of the terminal plug 36, there is provided a metallic plate 37 of aluminum or other materials, to give the head portion 36a high strength even though its thickness is small. This metallic plate 37 can be weld-fixed to the positive electrode external terminal 17 by laser welding or other methods. The metallic plate 37 could potentially fall out due to vibration, etc., since it is formed of an elastic member. However, weld-fixing the metallic plate 37 to the positive electrode external terminal 17 will render the through-hole 17b more robustly sealed by the terminal plug 36.

Furthermore, in the prismatic nonaqueous electrolyte secondary battery 10A of the first embodiment, the space in the current interruption mechanism 35 that corresponds to the exterior is completely sealed. But even if the pressure inside the outer casing 12 increases due to some cause, the pressure of the gases produced inside the battery will become extremely high during abnormality, and there will be no simultaneous similar increase in the pressure inside the sealed space in the current interruption mechanism 35 adjacent to the exterior of the battery. Thus, the space adjacent to the battery exterior being sealed will pose no problem for actuation of the current interruption mechanism 35.

Embodiment 2

The foregoing description of the prismatic nonaqueous electrolyte secondary battery 10A of Embodiment 1 sets forth an example where the first region 16a of the positive electrode collector 16 is wide, two second regions 16b are formed in mutually opposite positions with respect to the first region 16a, and two third fixing portions 30c are provided, one on each side in a direction perpendicular to the centerline c. However, there exist prismatic nonaqueous electrolyte secondary batteries that are narrow in width and have only one second region formed in a positive electrode collector. Thus, the prismatic nonaqueous electrolyte secondary battery 10B of Embodiment 2 is described below, using FIGS. 6 and 7, in which the first region 16a of the positive electrode collector 16 is narrow and only one second region 16b is formed.

Figure 7:
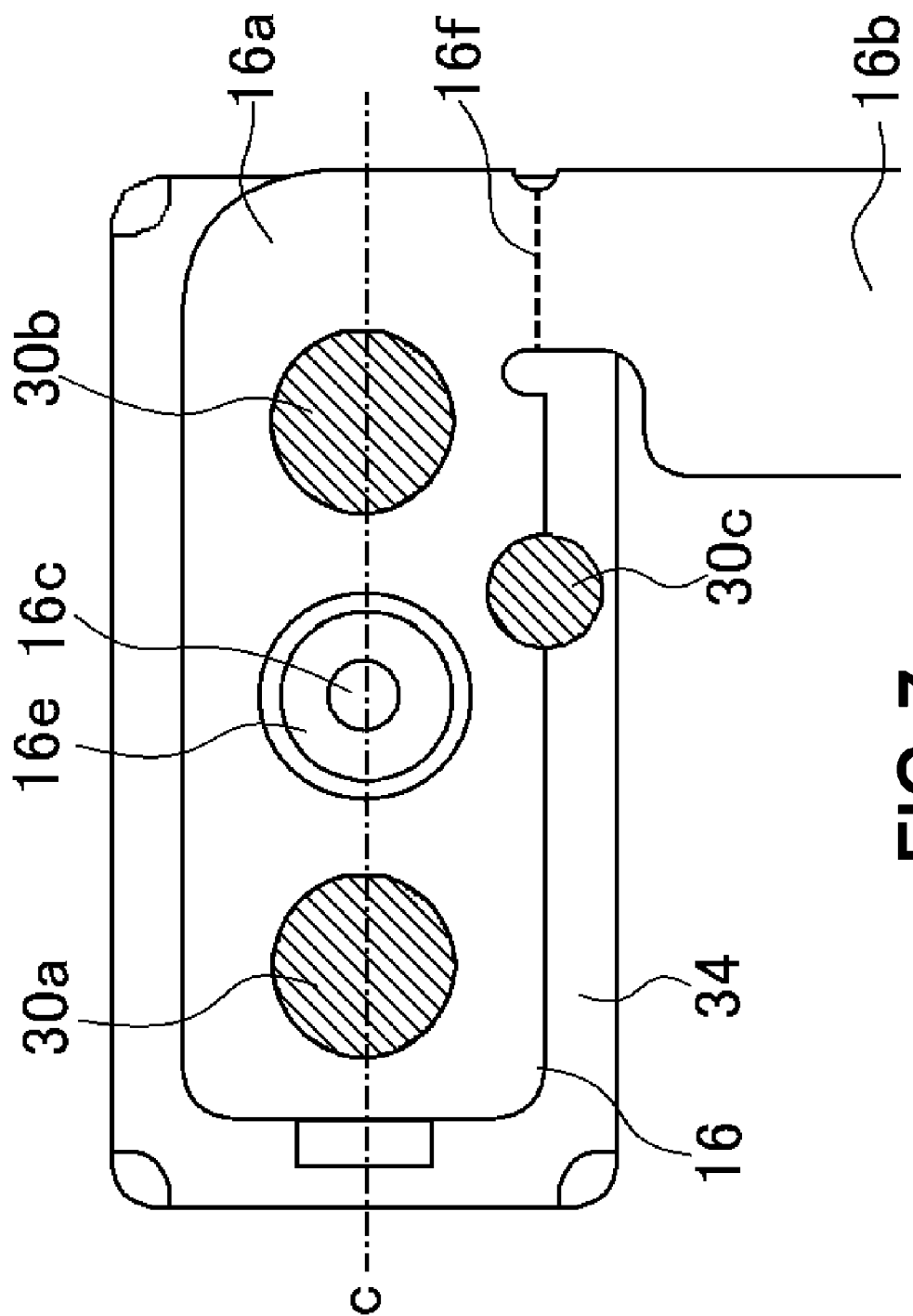
FIG. 7 is a schematic top view illustrating the state where the first region of a positive electrode collector is fixed to a second insulating member, in the second embodiment.
Figure 8B:
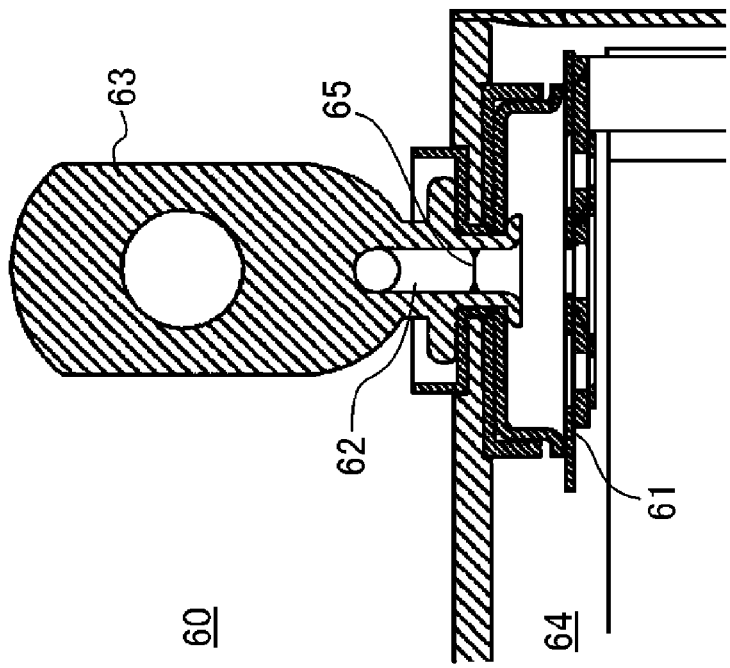
FIG. 8B is a sectional view of the current interruption mechanism in another prismatic secondary battery of the related art.
Figure 8A:
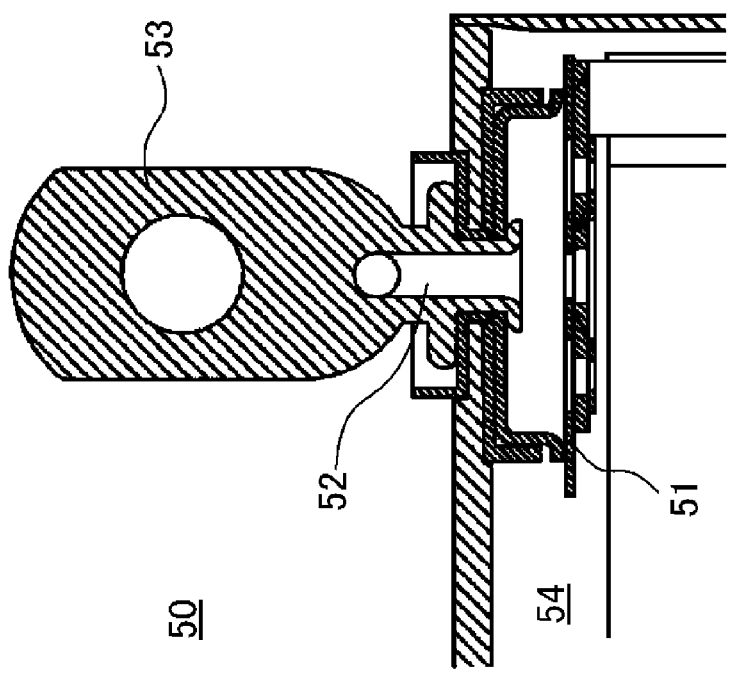
FIG. 8A is a sectional view of the current interruption mechanism in a prismatic secondary battery of the related art.
Figure 9:
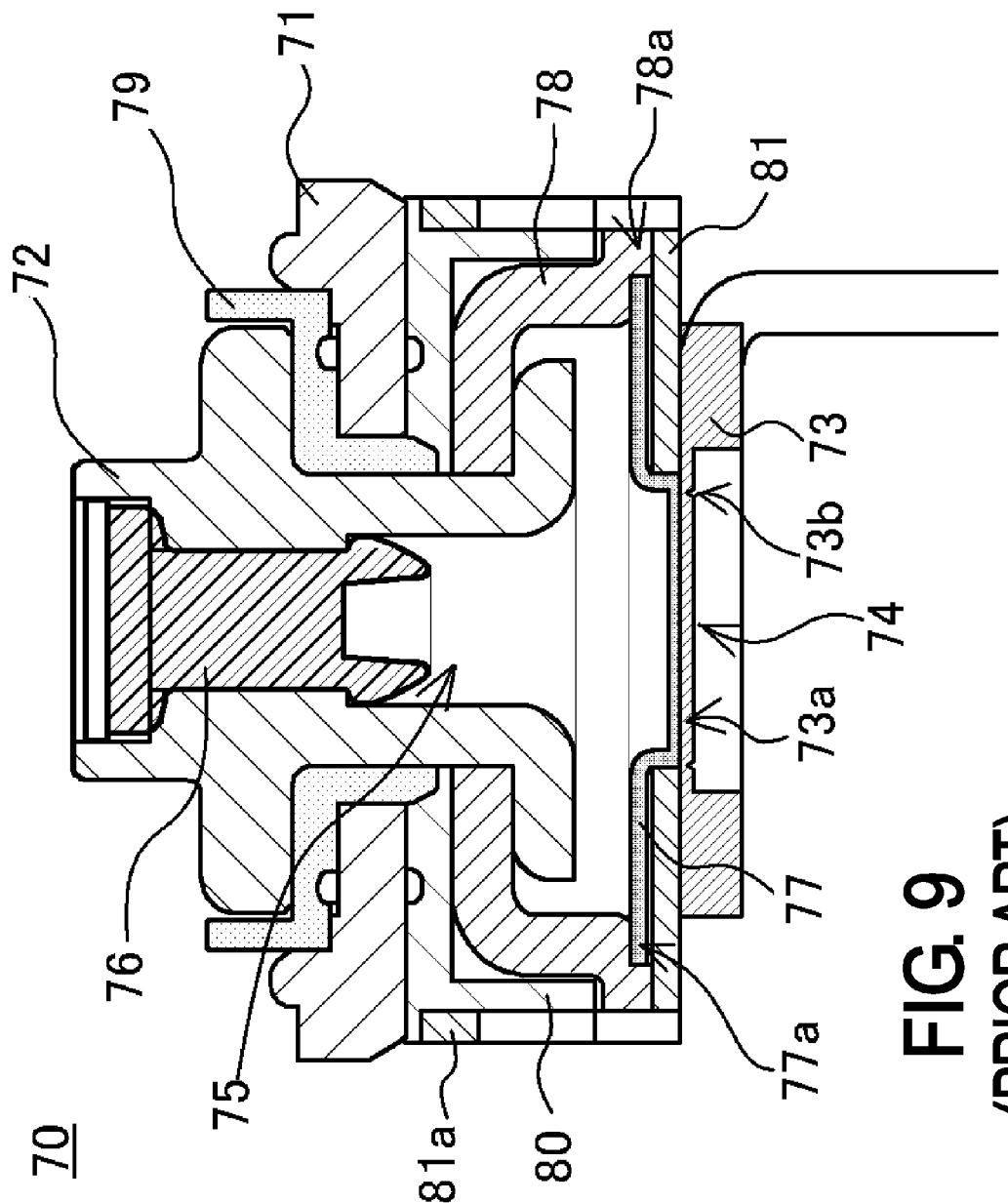
FIG. 9 is a sectional view of an external terminal in still another prismatic secondary battery of the related art.

FIG. 6A is an opened-out front view of the positive electrode collector of the prismatic nonaqueous electrolyte secondary battery of Embodiment 2, FIG. 6B is an opened-out side view of the same, and FIG. 6C is a sectional view, which corresponds to FIG. 1B, of the prismatic nonaqueous electrolyte secondary battery of Embodiment 2. FIG. 7 is a schematic top view illustrating the state where the first region of the positive electrode collector is fixed to a second insulating member, in Embodiment 2. The major points in which the prismatic nonaqueous electrolyte secondary battery 10B of Embodiment 2 differs structurally from the prismatic nonaqueous electrolyte secondary battery 10A of Embodiment 1 are the structure of the positive electrode collector 16 and accordingly the welds between the positive electrode substrate exposed portions 14 (see FIGS. 1A to 1C) and the positive electrode collector 16. Therefore, supporting reference will be made to FIGS. 1 to 3 as appropriate, identical structural components will be assigned the same reference numerals, and detailed descriptions of such items will be omitted.

The positive electrode collector 16 used in the prismatic nonaqueous electrolyte secondary battery 10B of Embodiment 2 has, as shown in FIGS. 6A and 6B, a first region 16a that is disposed in parallel with the sealing body 13, and a single second region 16b that extends from the first region 16a to the electrode assembly. This second region 16b is folded at the dashed line (boundary 16f) to be connected to the positive electrode substrate exposed portions 14. The positive electrode collector 16 is fabricated by punching an aluminum sheet of thickness 0.8 mm, and therefore is rigid and cannot be folded by a small force. In FIG. 6A, a cutout portion is formed at both ends of the boundary 16*f* to facilitate folding of the positive electrode collector 16 along the boundary 16*f*.

In the central portion of the first region 16*a* of the positive electrode collector 16, a connection forming hole 16*c* is formed. The centerline c passes through the center of the connection forming hole 16*c* in the long side direction of the sealing body 13. On the centerline c, there are formed a first opening 16*g* and a second opening 16*h*, one on each side of the connection forming hole 16*c*. On one side in the direction perpendicular to the centerline c, there is formed a single third opening 16*j*. The diameters of the first opening 16*g* and second opening 16*h* are identical, and the third opening 16*j* takes the form of a cutout with a diameter set to be smaller than the diameters of the first opening 16*g* and second opening 16*h*. The third opening 16*j* taking the form of a cutout can prevent the diminishment of the sectional area of the conductive pathway from the second region 16*b* to the connection forming hole 16*c*.

The second region 16*b* has a rib 16*d* formed in a place facing the bases of the positive electrode substrate exposed portions 14. The periphery of the connection forming hole 16*c* in the first region 16*a* has an annular thin region 16*e* whose thickness is thinner than the other portions.

Furthermore, as shown in FIG. 6C, a positive electrode collector receiving member 16*r* formed of the same material as the positive electrode collector 16 is in contact with the surface the positive electrode substrate exposed portions 14 opposite the surface that the second region 16*b* of the positive electrode collector 16 is in contact with. This positive electrode collector receiving member 16*r* is not directly electrically connected to the positive electrode external terminal 17, and plays the role of receiving and holding one of a pair of resistance welding electrodes during resistance welding of the second region 16*b* of the positive electrode collector 16 to the positive electrode substrate exposed portions 14. The positive electrode collector receiving member 16*r* has a rib 16*s*.

Furthermore, there is formed a second insulating member 34 that has a through-hole 34*a* between the first region 16*a* of the positive electrode collector 16 and the inversion plate 33. The first region 16*a* of the positive electrode collector 16 is electrically connected to the inversion plate 33 through the through-hole 34*a*. Around this through-hole 34*a* in the second insulating member 34, there are formed a first projection 34*b* in a position corresponding to the first opening 16*g* in the first region 16*a*, a second projection 34*c* in a position corresponding to the second opening 16*h*, and a third projection 34*d* in a position corresponding to the third opening 16*j*.

The first to third projections 34*b* to 34*d* of the second insulating member 34 are inserted into the first to third openings 16*g* to 16*j*, respectively, formed in the first region 16*a* of the positive electrode collector 16. Subsequently, the tips of the first to third projections 34*b* to 34*d* are heated so as to widen their diameters, thereby fixing the second insulating member 34 and the first region 16*a* of the positive electrode collector 16. As a result, the first to third projections 34*b* to 34*d* of the second insulating member 34 are, thanks to the widened-diameter portions formed in each of them, prevented from falling out from the first to third openings 16*g* to 16*j* formed in the first region 16*a* of the positive electrode collector 16. The second insulating member 34 is thus robustly joined to the first region 16*a* of the positive electrode collector 16. These fixing portions, which are formed by the first to third openings 16*g* to 16*j* formed in the first region 16*a* of the positive electrode collector 16 and the first to third projections 34*b* to 34*d* of the second insulating member 34, correspond to the first to third fixing portions 30*a* to 30*c* in the invention.

The specific dispositional arrangement of the first to third fixing portions 30*a* to 30*c* in the prismatic nonaqueous electrolyte secondary battery 10B of Embodiment 2 will now be described using FIG. 7. When the dispositions of the first and second fixing portions 30*a* and 30*b* have been determined, the third fixing portion 30*c* may take any desired position, provided that it is a position on the boundary 16*f* side of the centerline c that does not overlap with the first or the second fixing portion 30*a* or 30*b*. However, in FIG. 7, if the third fixing portion 30*c* is formed further leftward (centerward along the longitudinal direction of the sealing body 13) than a line that is perpendicular to the centerline c and passes through the center of the connection forming hole 16*c*, the effect of the third fixing portion 30*c* in suppressing the stress on the connecting portion when the second region of the collector is pulled due to the electrode assembly shifting in the event that the battery is subjected to shock as a result of vibration, falling, etc., will decline as the formation position of the third fixing portion 30*c* is located more leftward. Locating the third fixing portion 30*c* further leftward than the position corresponding to the first fixing portion 30*a* will be undesirable, since the stress suppressing effect of the third fixing portion 30*c* will be small. Hence, it is preferable that the center of the third fixing portion 30*c* be located further rightward (the edge side along the longitudinal direction of the sealing body 13) than a line that is perpendicular to the centerline c and passes through the right edge (the edge side along the longitudinal direction of the sealing body 13) of the first fixing portion 30*a*.

If the third fixing portion 30*c* is formed further rightward (the edge side along the longitudinal direction of the sealing body 13) than a line that is perpendicular to the centerline c and passes through the center of the connection forming hole 16*c*, the effect of the third fixing portion 30*c* in suppressing the stress on the connecting portion when the second region of the collector is pulled due to the electrode assembly shifting in the event that the battery is subjected to shock as a result of vibration, falling, etc., will be large as the formation position of the third fixing portion 30*c* is located more rightward. However, if the formation position of the third fixing portion 30*c* is further rightward (the edge side along the longitudinal direction of the sealing body 13) than the position corresponding to the second fixing portion 30*b*, the effect of the third fixing portion 30*c* in suppressing the stress on the connecting portion will be small. Hence, it is preferable that the center of the third fixing portion 30*c* be located further leftward (centerward along the longitudinal direction of the sealing body 13) than a line that is perpendicular to the centerline c and passes through the right edge (the edge side along the longitudinal direction of the sealing body 13) of the second fixing portion 30*b*. Furthermore, to prevent an increase in the internal resistance, it is preferable that the center of the third fixing portion 30 be located further leftward (centerward along the longitudinal direction of the sealing body 13) than a line that is perpendicular to the centerline c and passes through the left edge (centerward along the longitudinal direction of the sealing body 13) of the second fixing portion 30*b*. Thus, it is preferable that the third fixing portion 30*c* be formed between the position corresponding to the first fixing portion 30*a* and the position corresponding to the second fixing portion 30*b*.

In the prismatic nonaqueous electrolyte secondary battery 10A of Embodiment 1, similar to the prismatic nonaqueous electrolyte secondary battery 10B of Embodiment 2, it is preferable that the connection forming hole 16c that forms the connecting portion be formed on the distant side from the boundary 16f, of the line segment joining the center of the second fixing portion 30b and the center of the third fixing portion 30c, and that the third fixing portion 30c be formed in a position distant from the region joining the boundary 16f and the connection forming hole 16c, which forms the connecting portion.

The foregoing description of the prismatic nonaqueous electrolyte secondary battery 10A, 10B of the first and the second embodiments sets forth an example where the method for connection of the positive electrode collector 16 and positive electrode substrate exposed portions 14 is resistance welding. However, the method for connection may alternatively be laser welding or ultrasonic welding. It is possible to connect the positive electrode collector 16 to the end surfaces of the tips of the positive electrode substrate exposed portions 14. In addition, the foregoing description of the prismatic nonaqueous electrolyte secondary battery 10A, 10B of the first and the second embodiments sets forth an example where the terminal plug 36 of rubber that has a metallic plate 37 is used to seal the through-hole 17b of the positive electrode external terminal 17. However, the terminal plug 36 may be made of resin, or alternatively the through-hole 17b may be sealed by the metallic plate 37 alone.

Although the foregoing description of the prismatic nonaqueous electrolyte secondary battery 10A, 10B of the first and the second embodiments concerned the structure on the positive electrode external terminal 17 side, this can also be employed as the structure for the negative electrode external terminal 19 side. However, if a structure is employed in which the current interruption mechanism 35 is provided on the positive electrode external terminal 17 side, there will be no need to employ a current interruption mechanism on the negative electrode external terminal 19 side, and hence it is possible to employ a simpler structure for the negative electrode external terminal 19 side.

What is claimed is:

1. A prismatic secondary battery comprising:
   a bottomed, hollow, prismatic outer casing that has a mouth;
   an electrode assembly that is housed inside the prismatic outer casing and has positive electrode plate and negative electrode plate;
   a positive electrode collector that is electrically connected to the positive electrode plate;
   a negative electrode collector that is electrically connected to the negative electrode plate;
   a sealing body that seals the mouth of the outer casing;
   at least one external terminal that is inserted into a through-hole provided in the sealing body while being electrically insulated from the sealing body with a first insulating member interposed therebetween;
   a conductive member that has a tubular portion;
   an inversion plate containing conductive material, that is deformed when the battery interior pressure exceeds a particular value; and
   a second insulating member that is interposed between the inversion plate and at least one of the positive electrode collector and the negative electrode collector, and in which a through-hole is formed,
   at least one of the positive electrode collector and the negative electrode collector being connected to the inversion plate through the through-hole formed in the second insulating member,
   one end of the tubular portion of the conductive member being electrically connected to the external terminal, and the other end being sealed by the inversion plate,
   at least one of the positive electrode collector and the negative electrode collector having a first region that is parallel to the sealing body and a second region that extends from the first region in the direction of the electrode assembly and is connected to the positive electrode plate or negative electrode plate,
   the first region having: a connecting portion with the inversion plate; a first opening and a second opening each of which has at least one portion located on the centerline passing through the center of the connecting portion in the direction of the long sides of the sealing body and which are formed at both sides of the connecting portion; and at least one third opening or cut-out that is formed at a position distant from the centerline,
   wherein the first region further has a connection forming through-hole that is formed at the center of the connecting portion, wherein a portion around the circumference of the connection forming through-hole is welded to the inversion plate,
   the second insulating member having projections formed at positions corresponding to each of the first opening, the second opening, and the at least one third opening or cut-out, which are formed in the first region,
   the first opening, the second opening, and the at least one third opening or cut-out, which are formed in the first region, each engaging with the projections formed in the second insulating member to form a first fixing portion, a second fixing portion, and a third fixing portion, respectively.

2. The prismatic secondary battery according to claim 1, wherein each of the projections has an apex having a widened-diameter portion that has a wider diameter than a portion between the apex and the base thereof, and the first fixing portion, the second fixing portion, and the third fixing portion are formed so that the projections formed in the second insulating member engage by means of the widened-diameter portions with the first opening, the second opening, and the at least one third opening or cut-out, which are formed in the first region.

3. The prismatic secondary battery according to claim 1, wherein the connecting portion and the first and second fixing portions are disposed aligned on the centerline, and the third fixing portion is provided in a region nearer to the boundary between the first and second regions than to the centerline, in a direction perpendicular to the centerline.

4. The prismatic secondary battery according to claim 1, wherein two second regions are provided in mutually opposite positions relative to the centerline, and third fixing portions are provided on both sides in a direction perpendicular to the centerline.

5. The prismatic secondary battery according to claim 1, wherein a line joining the center of the third fixing portion and the center of whichever of the first and second fixing portion is nearer to a boundary between the first and second regions is located between the connecting portion and the boundary between the first and second regions.

6. The prismatic secondary battery according to claim 1, wherein
   a nearest distance from the third fixing portion to the second region is shorter than a nearest distance from the connecting portion to the second region and
   the third fixing portion is formed at a position distant from the region joining the connecting portion and the boundary between the first region and the second region.

7. The prismatic secondary battery according to claim 1, wherein the third fixing portion is formed between the position corresponding to the first fixing portion and the position corresponding to the second fixing portion.

8. The prismatic secondary battery according to claim 1, wherein the third fixing portion has a diameter that is smaller than those of the first and second fixing portions.

9. The prismatic secondary battery according to claim 1, wherein
the first region has a thin-walled portion around the first opening,
the thin-walled portion is formed thinner than the periphery of the thin-walled portion,
the projection formed at the position corresponding to the first opening has a widened diameter portion,
the widened diameter portion has an outside diameter wider than an inside diameter of the first opening and
the widened diameter portion is positioned on the surface of the thin-walled portion.

10. The prismatic secondary battery according to claim 1, wherein
the first region has a thin-walled portion around the first opening,
the thin-walled portion is formed thinner than the periphery of the thin-walled portion,
the projection formed at the position corresponding to the first opening has a widened diameter portion,
the widened diameter portion has an outside diameter wider than an inside diameter of the first opening,
the second insulating member has a body part positioned between the inversion plate and the first region and
the thin-walled portion is interposed between the body part of the second insulating member and the widened diameter portion in a thickness-direction of the thin-walled portion.

11. The prismatic secondary battery according to claim 1, wherein
the first region has a counterbore around the first opening,
the projection formed at the position corresponding to the first opening has a widened diameter portion and
the widened diameter portion has an outside diameter wider than an inside diameter of the first opening,
the widened diameter portion is positioned in the counterbore.

12. The prismatic secondary battery according to claim 1, wherein
the first region has the third opening,
the projection formed at the position corresponding to the third opening has an apex having a widened-diameter portion and
the widened-diameter portion has an outside diameter wider than an inside diameter of the third opening.

13. The prismatic secondary battery according to claim 1, wherein
the third fixing portion has at least one portion located on a line passing through the center of the connecting portion in a direction perpendicular to the centerline in the direction of the long sides of the sealing body.

14. The prismatic secondary battery according to claim 1, wherein
the first, second and third fixing portion are formed outside an area between a first segment and a second segment,
the first segment has endpoints at one end of a boundary between the first and second regions and a first tangent point on a tangent to the connection forming through-hole that passes through the one end of the boundary and has no intersection with a third segment having endpoints at the center of the connection forming through-hole and the middle point of the boundary and
the second segment has endpoints at the other end of the boundary and a second tangent point on a tangent to the connection forming through-hole that passes through the other end of the boundary and has no intersection with the third segment.

15. A prismatic secondary battery comprising:
a bottomed, hollow, prismatic outer casing that has a mouth;
an electrode assembly that is housed inside the prismatic outer casing and has positive electrode plate and negative electrode plate;
a positive electrode collector that is electrically connected to the positive electrode plate;
a negative electrode collector that is electrically connected to the negative electrode plate;
a sealing body that seals the mouth of the outer casing;
at least one external terminal that is inserted into a through-hole provided in the sealing body with a first insulating member interposed therebetween;
a conductive member that has a tubular portion;
an inversion plate containing conductive material, that is deformed when the battery interior pressure exceeds a particular value; and
a second insulating member that is interposed between the inversion plate and at least one of the positive electrode collector and the negative electrode collector, and in which a through-hole is formed,
at least one of the positive electrode collector and the negative electrode collector being connected to the inversion plate through the through-hole formed in the second insulating member,
one end of the tubular portion of the conductive member being electrically connected to the external terminal, and the other end being sealed by the inversion plate,
at least one of the positive electrode collector and the negative electrode collector having a first region that is parallel to the sealing body and a second region that extends from the first region in the direction of the electrode assembly and is connected to the positive electrode plate or negative electrode plate,
the first region having:
a connecting portion with the inversion plate; and
a first opening and a second opening each of which has at least one portion located on the centerline passing through the center of the connecting portion in the direction of the long sides of the sealing body and which are formed at both sides of the connecting portion,
wherein the first region further has a connection forming through-hole that is formed at the center of the connecting portion, wherein a portion around the circumference of the connection forming through-hole is welded to the inversion plate,
the second insulating member having projections formed at positions corresponding to each of the first opening, and the second opening,
the first opening, and the second opening each engaging with the projections formed in the second insulating member to form a first fixing portion, and a second fixing portion, respectively.

16. The prismatic secondary battery according to claim 15, wherein
the first region has a thin-walled portion around the first opening,
the thin-walled portion is formed thinner than the periphery of the thin-walled portion, the projection formed at the position corresponding to the first opening has a widened diameter portion, the widened diameter portion has an outside diameter wider than an inside diameter of the first opening, and the widened diameter portion is positioned on the surface of the thin-walled portion.

17. The prismatic secondary battery according to claim 15, wherein the first region has a thin-walled portion around the first opening, the thin-walled portion is formed thinner than the periphery of the thin-walled portion, the projection formed at the position corresponding to the first opening has a widened diameter portion, the widened diameter portion has an outside diameter wider than an inside diameter of the first opening, the second insulating member has a body part positioned between the inversion plate and the first region and the thin-walled portion is interposed between the body part of the second insulating member and the widened diameter portion in a thickness-direction of the thin-walled portion.

18. The prismatic secondary battery according to claim 15, wherein the first region has a counterbore around the first opening, the projection formed at the position corresponding to the first opening has a widened diameter portion, the widened diameter portion has an outside diameter wider than an inside diameter of the first opening and the widened diameter portion is positioned in the counterbore.

* * * * *